United States Patent [19]

Davis et al.

[11] Patent Number: 5,633,932

[45] Date of Patent: May 27, 1997

[54] APPARATUS AND METHOD FOR PREVENTING DISCLOSURE THROUGH USER-AUTHENTICATION AT A PRINTING NODE

[75] Inventors: Derek L. Davis, Phoenix; Lionel Smith, Queen Creek, both of Ariz.

[73] Assignee: Intel Corporation, Santa Clara, Calif.

[21] Appl. No.: 574,843

[22] Filed: Dec. 19, 1995

[51] Int. Cl.⁶ .................. H04L 9/32; H04L 9/00; B41J 29/54

[52] U.S. Cl. .................. 380/25; 380/3; 380/4; 380/23; 380/30; 380/49; 380/51; 380/55; 340/825.31; 340/825.34

[58] Field of Search .................. 380/3, 4, 23, 25, 380/30, 49, 50, 51, 55, 59; 340/825.31, 825.34

[56] References Cited

U.S. PATENT DOCUMENTS 4,961,224  10/1990  Yung .................. 380/25
5,509,074   4/1996  Choudhury et al. .................. 380/23

*Primary Examiner*—Bernarr E. Gregory
*Attorney, Agent, or Firm*—Blakely, Sokoloff, Taylor & Zafman

[57] ABSTRACT

A system and method for preventing a copy of a document to the output from a printing node until the printing node authenticates the intended recipient. The system includes a sending node, a printing node and a communication link coupling these nodes together in a network fashion. The sending node has access to a public key of the printing node and uses this public key to encrypt a header and document before transmission to the printing node over the communication link. The priority node has access to its private key to decrypt the header to ascertain whether the document requires authentication by the intended recipient before being output.

24 Claims, 4 Drawing Sheets

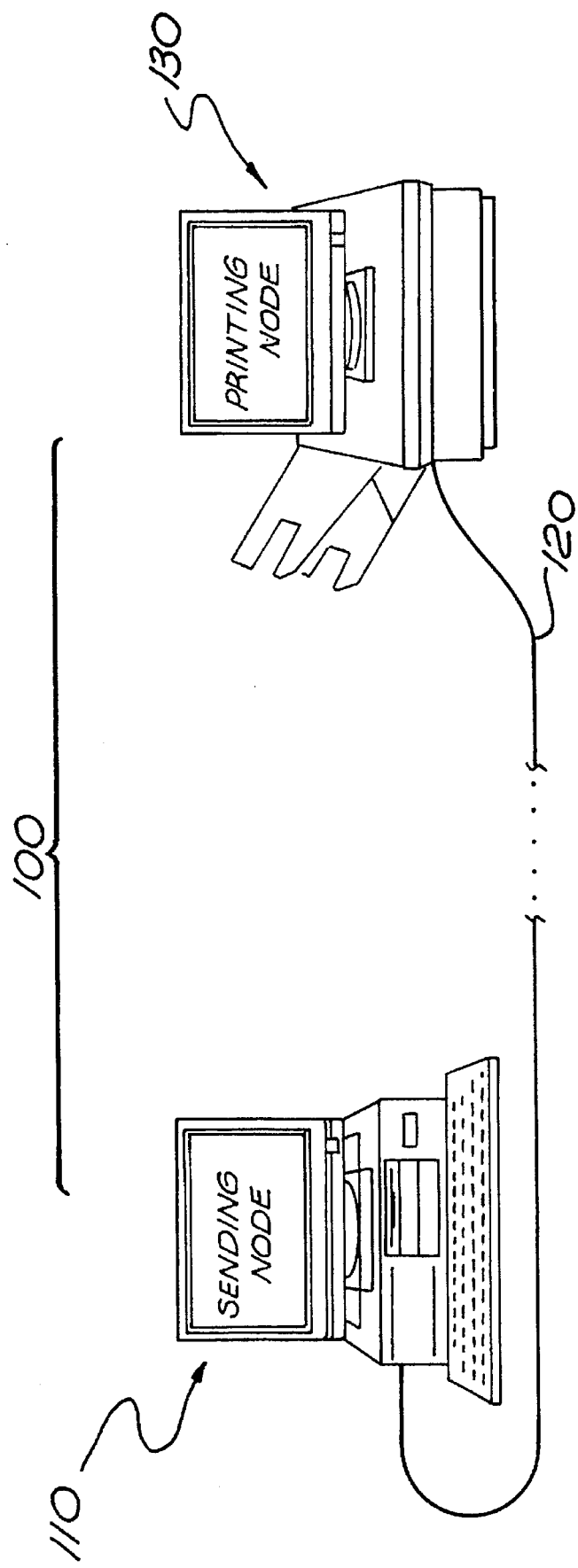

APPARATUS AND METHOD FOR PREVENTING DISCLOSURE THROUGH USER-AUTHENTICATION AT A PRINTING NODE

CROSS-REFERENCES TO RELATED APPLICATIONS

One of the named inventors of the present application has filed U.S. patent applications entitled "Apparatus and Method for Providing Secured Communications", application Ser. No. 08/251,486, filed May 31, 1994, now U.S. Pat. No. 5,539,828; "Roving Software License for a Hardware Agent", application Ser. No. 08/303,084, filed Sep. 7, 1994 now U.S. Pat. No. 5,473,692; and "Method for Providing a Roving Software License in a Hardware Agent-Based System", application Ser. No. 08/472,951, filed Jun. 7, 1995, now U.S. Pat. No. 5,568,552. These applications are owned by the same assignee of the present Application.

BACKGROUND OF THE INVENTION

1. Field of the Invention

The present invention relates to the field of data security. More particularity, the present invention relates to a system and method for preventing a printing node from outputting confidential information until confirmation that an authorized recipient of the confidential information is proximate to the printing node.

2. Description of Art Related to the Invention

With the continual emergence of smaller, faster and more powerful computers, many businesses are currently implementing "distributed" networks (e.g., local area networks and the like). These networks are advantageous in that each user has control over his or her own personal computer. Moreover, for economic reasons, multiple users can be connected to less frequently used hardware equipment such as printing nodes located in a public area accessible to all users. For the scope of this application, a "printing node" is defined as a stand-alone hardware device which can receive, temporarily store, and print or otherwise display data from a personal computer or any other transmission device. For example, a printing node may be represented as a printer, a printer operating in combination with a print server, a facsimile machine, a plotter, a remote monitor and the like.

A frequent problem experienced by distributed networks involves protecting confidential or proprietary information within documents (hereinafter referred to as "sensitive" documents) from being mistakenly or intentionally read by unauthorized persons. Since the printing node is positioned in a public area, upon transmission of a print job to the printing node, the sender must immediately walk or run over to the printing node to pick up the sensitive document in order to protect the confidentiality of the information contained therein. In the event that the printing node is experiencing a temporary problem (e.g., jammed, out of paper, low on toner, etc.) or is queued with other print jobs, the sender must wait at the printing node for the problem to be corrected or for the print job to be performed.

Alternatively, if available, the sender could return to his or her computer and cancel the print job associated with the sensitive document. But, of course, there is a risk that the document will be printed or displayed during the sender's return to his or her computer. However, if the print job is mistakenly sent to a different printing node, perhaps an off-site printing node, there are relatively few available options to protect the sensitive document from being printed or displayed and possibly read by an unauthorized individual if the sending error is detected after the print job has begun.

Regardless of whether print jobs may or may not be canceled, for distributed networks, persons waste valuable work time waiting around the printing nodes for sensitive documents. Such waste adversely affects the productivity of the sender and his or her company.

Another problem experienced by distributed networks is protecting confidential information in sensitive documents from public view when printed for another person (e.g., a co-worker) at another site. Of course, the sensitive document could be electronically mailed to the co-worker in an encrypted format. Sometimes, however, it may be undesirable to electronically send a sensitive document because of the possibility that it could be altered and/or electronically forwarded to unintended recipients. Of course, the document could be printed and mailed to the co-worker but there exist obvious disadvantages such as time delay, mail security, etc. Thus, it would also be advantageous to create a system and method which eliminates the inefficiencies associated with protecting sensitive information printed from a printing node intended for the sender or another intended recipient.

SUMMARY OF THE INVENTION

The present invention relates to a system and method for preventing a copy of a document from being output (printed, displayed, etc.) by a printing node until the printing node locally authenticates the intended recipient. The system includes a sending node, a printing node and a communication link coupling these nodes together in a network fashion. The sending node has access to a public key of the printing node and uses this public key to encrypt a header and document before transmission to the printing node over the communication link. The printing node has access to its private key to decrypt the header to ascertain whether the document is "sensitive" (i.e., requires recipient authentication before priority). If so, the printing node locally buffers the document until it receives authorization to output the document.

BRIEF DESCRIPTION OF THE DRAWINGS

The features and advantages of the present invention will become apparent from the following detailed description of the present invention in which:

FIG. 1 is a simplified block diagram of a distributed, secure network system comprising a sending node and a printing node.

DESCRIPTION OF THE PREFERRED EMBODIMENT

The present invention relates to an apparatus and method for preventing the printing of a sensitive document at a printing node until the intended recipient authorizes such printing to occur. Although numerous details are set forth in order to provide a thorough understanding of the present invention, it is apparent to a person of ordinary skill in the art that the present invention may be practiced through many different embodiments in addition to that embodiment illustrated without deviating from the spirit and scope of the present invention. In other instances, well-known circuits, elements and the like are not set forth in detail in order to avoid unnecessarily obscuring the present invention.

In the detailed description, a number of cryptography-related terms are frequently used to describe certain characteristics or qualities which is defined herein. A "key" is an encoding and/or decoding parameter for a conventional cryptographic algorithm. More specifically, the key is a sequential distribution ("string") of binary data being "n" bits in length, where "n" is an arbitrary number. A "document" is generally defined as a predetermined amount of data such as one or more pages of data being transferred in a sequence of bus cycles. A "digital certificate" is defined as a set of any digital information cryptographically bound together through use of a private key by a widely known trusted authority (e.g., bank, governmental entity, trade association, equipment manufacturer, company security, system administration, etc.). A "digital signature" is a similar technique used to assure integrity of a message, using the private key of the message originator.

Referring to FIG. 1, a simplified version of a distributed, secure network system configured to prevent sensitive documents from being mistakenly printed is shown. The secure network system 100 includes at least one sending node 110 coupled through communication lines 120 to a printing node 130. Although not shown, more than one sending node could be coupled to the printing node 130 through shared or independent communication similar to lines 120. As secure network systems gain greater commercial acceptance, a document will generally be encrypted within the sending node 110 before it is placed on the communication line(s) 120. This will protect against an interloper gaining access to the confidential information as it is transmitted to the printing node 130. Thus, the printing node 130 preferably includes software or hardware, such as disclosed in the above cited cross-referenced applications, to decrypt the document before outputting.

Figure 2A:
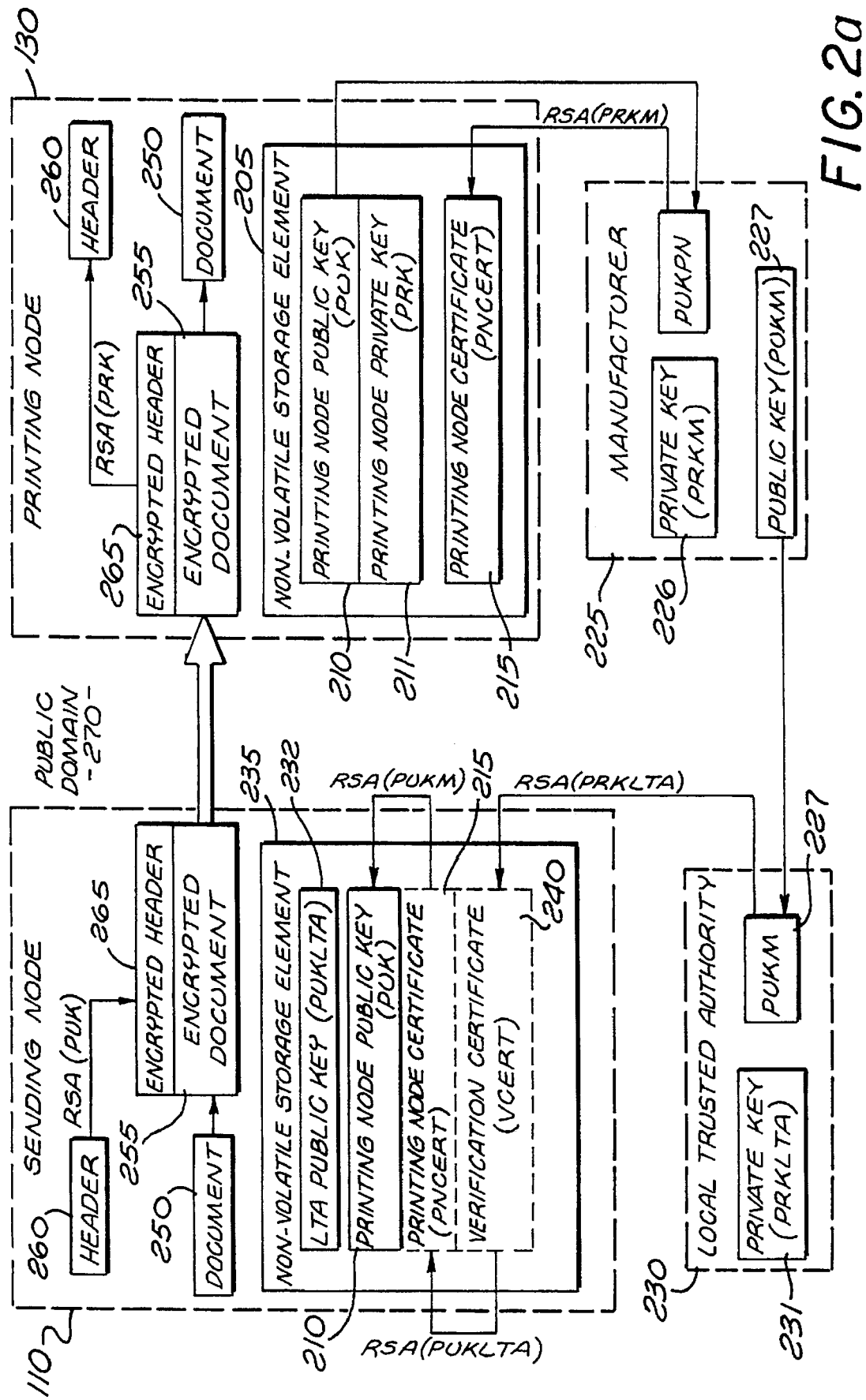
FIGS. 2a and 2b are block diagrams of a network system using different verification methods concerning the public key of the printing node and both transferring an encrypted header and document from the sending node to the printing node.
Figure 2B:
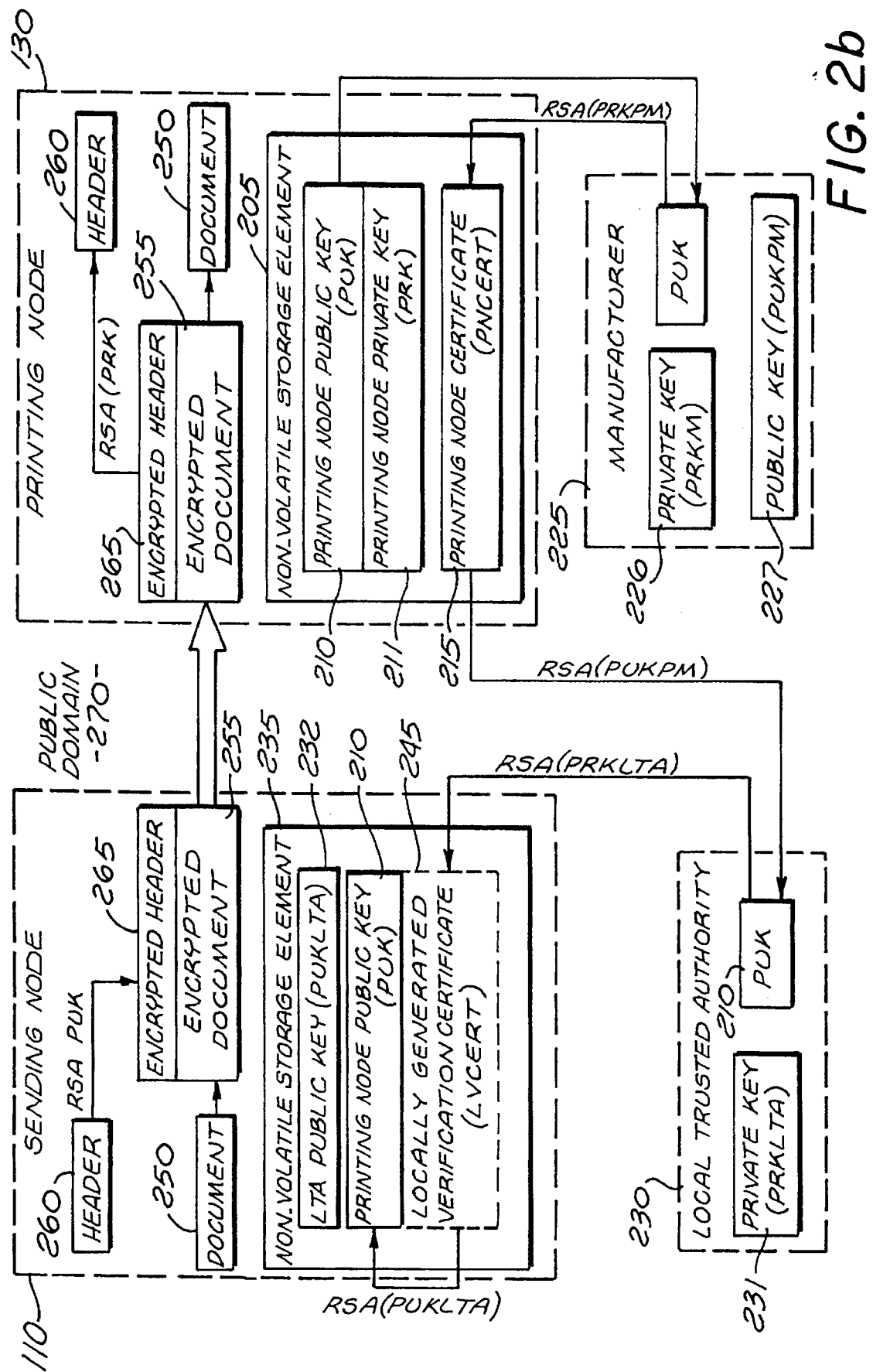

Referring now to FIGS. 2a–2b, illustrative embodiments of the network system using an asymmetric key technique adopted by the sending and printing nodes 110 and 130 are shown. This asymmetric technique uses two separate keys (referred to as a "public key" and "private key") for encryption and decryption purposes. To establish unidirectional communications from the sending node 110 to the printing node 130, the public key of a printing node ("PUK") should be initially accessible to the sending node 110 through any one of several verification methods such as through a network-based printer-key server, through an initialization of all network nodes with relevant printer public keys as they are added to the network, or through any other conceivable method. Each of these possible methods may use one or more digital certificates issued by at least one trusted authority to obtain PUK and substantiate its authenticity of the printer node.

One method of obtaining and verifying PUK is shown in FIG. 2a. A trusted authority such as a printing node manufacturer 225 produces the printing node 130 having a public key ("PUK") 210 and a private key ("PRK") 211 within a non-volatile storage element 205 implemented within the printing node 130. In addition, the manufacturer 225 stores a printing node certificate ("PNCert") 215 within the non-volatile storage element 205. The printing node certificate PNCert 215 is equivalent to at least PUK 210 encrypted with a private key ("PRKM") 226 of the manufacturer 225. After verification and storage of PUK in a non-volatile storage element 235 of the sending node 110, the PNCert 215 may also be stored in the non-volatile storage element 235. Such storage is optional because PNCert 215 would not be needed again unless PUK 210 is corrupted or accidentally removed from sending node 110.

After connecting the printing node to a network and distributing PNCert 215 to the sending node 110 coupled to the network, the sending node 110 can use PNCert 215 to verify (i) the authenticity of the printer node's public key ("PUK") at its initial distribution and (ii) the characteristics of the printing node (i.e., whether it is able to enforce recipient authentication procedures). Such verification may be accomplished by a local trusted authority 230 (e.g., a system administrator or security office of an entity owning the printing node) issuing a verification certificate ("VCert") 240 being the public key of the manufacturer ("PUKM") 227 encrypted with the private key of the local trusted authority ("PRKLTA") 231. The public key of the local trusted authority ("PUKLTA") 232 would be widely available to the users of the network. The verification certificate 240 may be decrypted to obtain PUKM 207 which can be used to obtain PUK 210 by decrypting PNCert 215.

Another example of a method which can obtain as well as verify PUK is shown in FIG. 2b in which the local trusted authority 230 internally certifies PUK 210 before providing it to the sending node 110. As shown, the local trusted authority 230 obtains PUK 210 from the printing node 130 by decrypting PNCert 215 using the public key of the printing node manufacturer "PUKM" 227. Thereafter, the local trusted authority 230 creates a locally generated verification certificate ("LVCert") 245 and sends LVCert 245 to the sending node 110. Similar to PNCert of FIG. 2a, LVCert 245 may be stored in the non-volatile storage element 235 after verification of PUK 210 if desired. The sending node 110 decrypts LVCert 245 using PUKLTA 231 which is widely available. As a result, the sending node 110 obtains PUK 210 which is subsequently stored in the non-volatile storage element 235.

As shown in both FIGS. 2a and 2b, after the public key "PUK" 210 of the priority node 130 is available to the sending node 110, the sending node 110 can encrypt a document 250 under an asymmetric "Rivest Shamir Adlemann" ("RSA") algorithm using PUK 210. This forms an encrypted document 255 to be transmitted to the printing node 130. Additionally, a header 260 for the document is encrypted using the public key "PUK" 210 of the targeted printing node 130 producing an encrypted header 265. As an alternative to RSA encryption of the print job, "header" may contain a "session key" that is then used by both the sender and receiver to perform the required cryptographic operations on the document. It is well-known that a "header" is a common technique to reduce the computational performance normally associated with public key cryptography, especially for large data sets. However, for this invention, the header 260 includes control information which allows the printing node 130 to support various functions.

For example, the header 260 may include control information indicating that the document is a "sensitive" document by selecting the document to have a certain "confidentiality" level thereby requiring on-site authentication of the intended recipient before printing if the confidentiality level exceeds a predetermined (or normal) level. Another example is for the header 260 to include a public key of the intended recipient of a printed copy of sensitive document. Thus, before printing the "sensitive" document, the printing node 130 would confirm that the recipient is present through one of a number of authentication techniques (discussed below) using the public key of the intended recipient. A further example is that the control information may include tag information such as a "print only" tag. This tag would allow the "sensitive" document 250 to be printed from the printing node 130 but would not allow the document 250 to be stored in its text format in memory. A logical extension of this "print only" tag is the control information including a parameter which indicates the number of times the "sensitive" document could be printed.

In a preferred embodiment, a print job being a concatenation of the encrypted header 265 and the encrypted document 255 is transferred through a public domain 270 and into the printing node 130. The printing node 130 first decrypts the encrypted header 265 using PRK 211 to ascertain whether the encrypted document 255 contains confidential information requiring the printing node 130 to refrain from at least printing the document 250 until the intended recipient is present at the printing node 130. Thus, the document 250 is temporarily stored in buffer memory (not shown) within the printing node 130 preferably, but not necessarily, in its encrypted format. Upon receiving confirmation that the intended recipient is present, the encrypted document 250 is (i) retrieved from the buffer memory, (ii) decrypted, and (iii) printed.

It is contemplated that there may exist conditions when the document is not retrieved or the buffer memory becomes full. In these and other related conditions, it may be necessary to "flush" (i.e., delete from memory) certain unretrieved documents from the buffer memory thereby freeing up memory space. This may be performed automatically through software and/or hardware or manually by a system administrator, users of the network and the like.

There are a number of authentication techniques to confirm that the intended recipient is present at the printing node. One technique is to await a personal identification number ("PIN") of the intended recipient to be entered through a keyboard and number pad on the printing node before starting a print job of a sensitive document. In this case, the printing node may contain memory storing PINs associated with each recognized public key or the PIN may be transmitted to the printing node through the header.

Another technique is to enter a "release code" through the keyboard. The release code is job-specific being generated by the sending node at print-time and included in the header. The release code is displayed on the display monitor of the computer for a brief period of time to provide the user sufficient information to retrieve the print job. If the intended recipient is not the sending user, the sending user may communicate the release code through a telephone call, electronic mail, or any other means to the intended recipient.

Yet another technique is to use some type of authenticating token such as a PCMCIA identifier card or smart card which can be inserted into the printing node. Instead of requiring the printing node to maintain a record of token identifications, the public key of the token would be included in the header and transmitted to the printing node preferably in an encrypted format. Thus, the printing node would need to simply match the public key of the token to the public key previously received in the header of the print job and execute a standard challenge/response protocol with the token. Such a challenge/response protocol ensures that the token is authentic by proving the token is in possession of the private key corresponding to the header-specified public key.

A fourth technique is to utilize an access control technique called "biometrics" which uses a capturing device primarily for facility security (e.g., buildings, rooms, etc.). Biometrics involves sensing a characteristic of the user (e.g., finger print, iris, retina, etc.) to capture a single frame of data (generally referred to as "data frame") or more likely multiple data frames of the characteristic and comparing the captured data frames with a previously stored master. If each of the captured data frames compare correctly to the stored master, the user is identified and authenticated.

Figure 3:
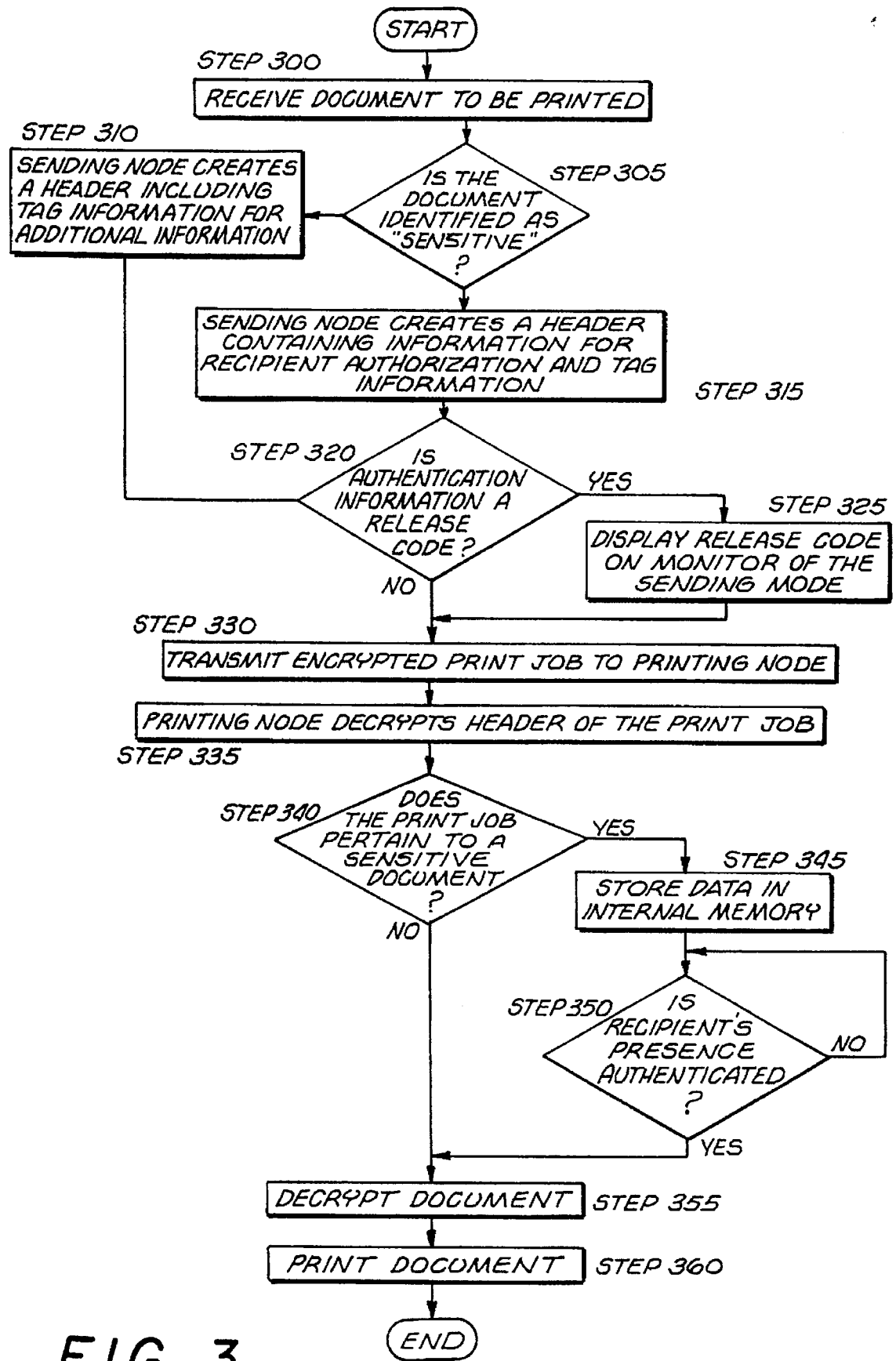
FIG. 3 is a flowchart illustrating the method for ensuring that a sensitive document tagged as containing confidential information will not be output until the recipient is present.

Referring now to FIG. 3, a flowchart illustrating the operations of the network system are shown. First, the document must be identified as a "sensitive" document or a normal document depending on whether confidential and/or proprietary information is contained in the document (Step 300). If a normal document, upon transmitting the document to a printing node, the sending node creates a header including disclosure protection information such as "print-only" tags which restrict the document to only be printed, mitigating any chances to modify the document (Steps 305–310). Thereafter, the header and document are encrypted before being transmitted to the printing node.

However, if the document is "sensitive", upon transmitting the document to a printing node, the sending node creates a header including information necessary to authenticate the intended recipient (public key, tokens and the like) and any information needed for additional disclosure protection (Steps 305, 315). If the authentication information is a release code, the release code must be displayed on a display monitor of the sending node to enable the intended recipient to instruct the printing node to begin printing the sensitive document (Step 320 and 325). Thereafter, the header and document are encrypted forming a print job and the print job is transmitted to the printing node (Step 330).

Upon receiving the print job, the printing node decrypts the header to determine whether the document is a "sensitive document" (Step 335 and 340). If the document is a normal document, the printing node decrypts the document (Step 355) and subsequently prints the document (Step 360). However, if a sensitive document, the printing node stores the encrypted document in an internal buffer memory (Step 345) and awaits authentication by the intended recipient that he or she is near the printing node (Step 350). Upon receiving authentication through providing a PIN, release code, an authentication token and the like, the printing node decrypts the document and thereafter prints the document (Steps 355 and 360). It is contemplated that the sensitive document may be decrypted prior to Step 345 so that once the intended recipient is identified, the sensitive document is queued for printing and printed (Step 360).

The invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for preventing a printing node from outputting a copy of a document until an intended recipient of the document is authenticated, the method comprising the steps of:

selecting a confidentiality level for a print job including the document, said confidentiality level is selected to be equal to at least a predetermined level when the document contains sensitive information;

creating a header for said print job, said header being a first header when said confidentiality level is equal to at least the predetermined level, said first header including at least (i) information used to authenticate the intended recipient, and (ii) control information including at least said confidentiality level;

transmitting said print job to the printing node;

analyzing said header by the printing node; and outputting the document once the intended recipient is authenticated, and thus, is physically proximate to the printing node.

2. The method according to claim 1, wherein said header created by said creating step being a second header when said confidentiality level is selected to be less than said predetermined level, said second header consists of control information.

3. The method according to claim 2, wherein prior to said transmitting step, the method further includes the step of encrypting said header with a public key of the printing node.

4. The method according to claim 3, wherein prior to said transmitting step, the method further includes the step of encrypting the document with said public key of the printing node.

5. The method according to claim 3, wherein said analyzing step includes the step of decrypting said header with a private key of the printing node to determine said confidentiality level.

6. The method according to claim 5, wherein said analyzing step further includes the step of buffering the document in a format encrypted by said public key of the printing node when the confidentiality level is at least equal to the predetermined level.

7. The method according to claim 1, wherein the outputting step includes the step of decrypting the document with a private key of the printing node upon completing authentication of the intended recipient.

8. The method according to claim 7, wherein the outputting step further includes the step of printing the document.

9. The method according to claim 1, wherein the intended recipient is authenticated by performing one of a plurality of authentication techniques including (i) inputting a personal identification number into the printing node, (ii) inputting a release code into the printing node, and (iii) inserting an authenticating token into the printing node.

10. The method according to claim 1, wherein the intended recipient is authenticated by a capturing device of the printing node obtaining biometric data of the intended recipient and comparing the biometric data to a pre-stored data.

11. A method for preventing a printing node from outputting a copy of a document associated with a print job until an intended recipient of the document is authenticated, the method comprising the steps of:

creating a first header for said print job, said first header including at least (i) information used to authenticate the intended recipient, and (ii) control information including at least a confidentiality level to indicate whether the document contains sensitive information;

encrypting said first header and the document of said print job with a public key of the printing node;

transmitting said print job to the printing node;

storing the encrypted document in the printing node; and decrypting the encrypted document and queuing the document to be output once the intended recipient has been authenticated to signify that the intended recipient is physically proximate to the printing node.

12. The method according to claim 11, wherein said control information of said header includes a public key of the intended recipient.

13. The method according to claim 11, wherein said control information further includes a print-only tag.

14. The method according to claim 11, wherein said control information further includes a parameter indicating a number of times the document can be output.

15. A method for preventing a printing node from outputting a copy of a document associated with a print job until an intended recipient of the document is determined to be physically proximate to the printing node, the method comprising the steps of:

selecting a confidentiality level for the print job;

creating a header for said print job, wherein if said confidentiality level is at least equal to a predetermined level, said header being a first header including at least (i) information to authenticate the intended recipient, and (ii) a first set of control information including at least said confidentiality level, and if said confidentiality level is less than said predetermined level, said header being a second header including a second set of control information;

encrypting said print job;

transmitting said print job to the printing node; and decrypting said header to obtain the confidentiality level, wherein if the confidentiality level is at least equal to said predetermined level, temporarily storing the document, and outputting the document once the intended recipient is authenticated and physically proximate to the printing node, and if the confidentiality level is less than said predetermined level, preparing the document to be output by the printing node.

16. A system that prevents a copy of a document from being output from a printing node until the printing node receives local authentication from an intended recipient of the document, the system comprising:

a communication link;

a sending node coupled to said communication link, said sending node includes a storage element which contains at least a public key associated with the printing node, said sending node utilizes said public key to encrypt both a header of the document and the document prior to transmission to the printing node via said communication link; and the printing node coupled to said communication link, the printing node includes a storage element which contains at least a private key associated with the printing node, the printing node decrypts said header to obtain a confidentiality level of the document and prevents the document from being output until authentication that the recipient is physically proximate to the printing node when the confidentiality level exceeds a predetermined level.

17. The system according to claim 16, wherein said sending node is a computer.

18. The system according to claim 16, wherein said printing node is one of a printer, a plotter, a facsimile machine and a display monitor.

19. The system according to claim 16, wherein both said storage element of said sending node and said storage element of said printing node are non-volatile memory.

20. The system according to claim 16, wherein said storage element of said printing node further contains a digital certificate being at least said public key of the printing node encrypted with a private key of a trusted authority.

21. The system according to claim 16, wherein said printing node includes internal memory to store the document until the intended recipient is authenticated, and thus, physically proximate to the printing node.

22. A system that either immediately queues a non-confidential document to be output from a printing means or prevent a copy of a confidential document from being output from the printing means, the system comprising:

sending means for encrypting a print job having a first header and the confidential document with a public key of the printing node and for transmitting the encrypted first header and encrypted confidential document to the printing means, said sending means includes a first storage means for containing at least said public key;

printing means for decrypting said first header, analyzing said first header to determine that said print job contains the encrypted confidential document and for preventing the confidential document from being printed until authentication that an intended recipient is physically proximate to the printing means; and means for communicating between said sending means and said printing means.

23. The system according to claim 22, wherein said sending means further encrypts another print job having a second header and the non-confidential document with said public key of the printing node and transmits the encrypted second header and encrypted non-confidential document to said printing means.

24. The system according to claim 23, wherein the printing means further decrypts said second header thereby determining that said another print job has the non-confidential document and prepares the non-confidential document to be output without authentication of the recipient.

* * * * *